US010431118B2

(12) United States Patent
Shah (10) Patent No.: US 10,431,118 B2
(45) Date of Patent: Oct. 1, 2019

(54) BRAILLE CELLS AND ASSEMBLIES FOR SINGLE-LINE BRAILLE DISPLAYS

(71) Applicant: Inceptor Technologies Pvt. Ltd., Ahmedabad (IN)

(72) Inventor: Shyam Shah, Ahmedabad (IN)

(73) Assignee: INCEPTOR TECHNOLOGIES PVT. LTD., Ahmedabad (IN)

( * ) Notice: Subject to any disclaimer, the term of this patent is extended or adjusted under 35 U.S.C. 154(b) by 223 days.

(21) Appl. No.: 15/674,612

(22) Filed: Aug. 11, 2017

(65) Prior Publication Data

US 2017/0372636 A1    Dec. 28, 2017

Related U.S. Application Data

(63) Continuation of application No. PCT/IN2016/000036, filed on Feb. 4, 2016.

(30) Foreign Application Priority Data

Oct. 25, 2015    (IN) .......................... 4021/MUM/2015

(51) Int. Cl.
*G09B 21/00*    (2006.01)

(52) U.S. Cl.
CPC .................................. *G09B 21/004* (2013.01)

(58) Field of Classification Search
USPC .......................... 434/112–115, 117; 400/109.1
See application file for complete search history.

(56) References Cited

U.S. PATENT DOCUMENTS

| 5,086,287 A * | 2/1992 | Nutzel | G09B 21/003 340/407.1 |
| 5,226,817 A * | 7/1993 | Nakajima | G09B 21/004 434/112 |
| 6,693,516 B1 * | 2/2004 | Hayward | G09B 21/004 340/4.12 |

(Continued)

FOREIGN PATENT DOCUMENTS

CN    102176293    9/2011

OTHER PUBLICATIONS

WIPO, Written Opinion in corresponding PCT Application PCT/IN2016/000036, dated Jul. 18, 2016.
(Continued)

*Primary Examiner* — Kurt Fernstrom
(74) *Attorney, Agent, or Firm* — Ryan Alley IP (57) ABSTRACT

Braille cells and assemblies include an actuator that engages and makes readable a Braille dot by rotating about a hinge on a base to engage the dot. An electro-permanent magnet on the rod and a magnetic plate on the underlying base can cause the rotation. By running an electric pulse through the electro-permanent magnet, it will rotate the rod about the pivot hinge under attraction to the magnetic plate at the other end of the base. The rod then engages with a tactile pin contacting the Braille dot and making it readable. An electric pulse in an opposite direction may cause the magnetic field to cease and the tactile pin to disengage. The electro-permanent magnet may be coupled a mesh of rows and columns each with a P-channel MOSFET and N-channel MOSFET on opposite ends. The magnet may be at an intersection of a row and a column with diodes.

20 Claims, 7 Drawing Sheets

(56) References Cited

U.S. PATENT DOCUMENTS

| | | | | |
|---|---|---|---|---|
| 6,705,868 B1* | 3/2004 | Schleppenbach | .... | G09B 21/004 434/112 |
| 6,734,785 B2* | 5/2004 | Petersen | .............. | G09B 21/004 340/4.12 |
| 6,776,619 B1* | 8/2004 | Roberts | ................ | G09B 21/001 340/4.12 |
| 6,881,063 B2* | 4/2005 | Yang | ................... | G09B 21/001 434/114 |
| 7,097,457 B2* | 8/2006 | Kajino | ................ | G09B 21/004 434/112 |
| 7,367,806 B1* | 5/2008 | Murphy | ............... | G09B 21/004 434/112 |
| 7,497,687 B2* | 3/2009 | Shin | ..................... | G09B 21/004 434/113 |
| 7,744,372 B1* | 6/2010 | Minnich | ................ | G09B 21/02 434/113 |
| 8,690,576 B2* | 4/2014 | Murphy | ............... | G09B 21/003 434/114 |
| 9,390,676 B2* | 7/2016 | Nieves | .................... | G06F 3/016 |
| 2005/0158695 A1 | 7/2005 | Takahashi | | |
| 2011/0057921 A1 | 3/2011 | van Hees et al. | | |

OTHER PUBLICATIONS

WIPO, International Search Report in corresponding PCT Application PCT/IN2016/000036, dated Oct. 31, 2016.

\* cited by examiner

BRAILLE CELLS AND ASSEMBLIES FOR SINGLE-LINE BRAILLE DISPLAYS

RELATED APPLICATIONS

This application claims priority under 35 U.S.C. § 120 to, and is a continuation of, co-pending International Application PCT/IN2016/000036, filed Feb. 4, 2016 and designating the US, which claims priority to Indian Application 4021/MUM/2015, filed Oct. 25, 2015, such Indian Application also being claimed priority to under 35 U.S.C. § 119. These Indian and International applications are incorporated by reference herein in their entireties.

BACKGROUND

Blindness and visual impairment are conditions of poor visual perception. Blindness causes severe impairment in daily or normal life and routine. As of 2012 there were 285 million visually-impaired people in the world, of which 246 million had low vision and 39 million were blind. Literacy rate among blind is as low as 2% in developing countries and 10% in others because of the difficulty of learning Braille and lack of teachers as well as a lack of resources during learning and post learning.

Braille is a tactile writing system used by the blind and the visually impaired. It is traditionally written with embossed paper. Braille-users can read computer screens and other electronic supports thanks to refreshable Braille displays. Commercially available Braille displays use electromechanical Braille cells which utilize piezoelectric reeds to move the dots. Typically, the piezoelectric reeds are stacked in 2 columns and in 4 rows connected to 8 Braille dots. By applying an electric voltage, the reeds bend pushing the Braille dots through the reading surface emulating a Braille dot.

Figure 1:
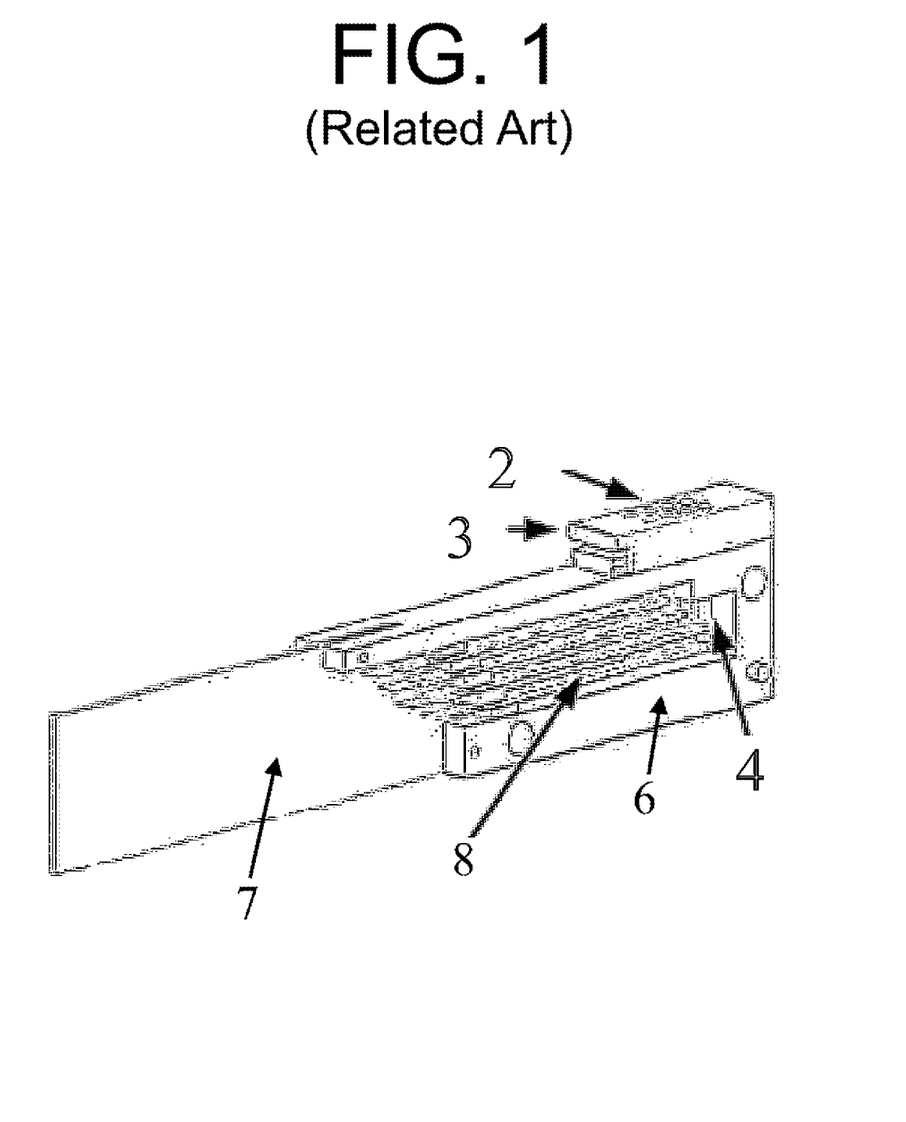
FIG. 1 is an illustration of a related art piezoelectric Braille cell.

FIG. 1 illustrates an assembly drawing of a related art piezoelectric Braille cell. Reference numeral 2 refers to Braille dots on a cap 3. Reference numeral 4 refers to a pin which is located on a base 6, which pins are activated by inputs from a PCB 7 in relation to a line that is to be displayed. Reference numeral 8 refers to a piezoelectric bimorph which activates the pins 4.

SUMMARY

Example embodiments include braille cells and assemblies including Braille cells for displaying a line of Braille. Example embodiments include an actuator that engages and makes readable a Braille dot by rotating to engage the dot. The actuation may be achieved by a rod that can pivot about a hinge mounted to a base. An electro-permanent magnet on the rod and a magnetic plate on the underlying base can cause the rotation. For example, when the electro-permanent magnet has its magnetic field or flux activated, it will rotate the rod about the pivot hinge to draw closer to the magnetic plate at the other end of the base. The other end of the rod then engages with a tactile pin contacting the Braille dot and making it readable. The activation may be started by an electric pulse in one direction and stopped by an electric pulse in an opposite direction, causing the tactile pin to disengage. The electro-permanent magnet may be coupled a mesh framework with rows of a P-channel MOSFET on one end and an N-channel MOSFET on another end and columns of a P-channel MOSFET on one end and an N-channel MOSFET on another end. The magnet may be at an intersection of row and column with diodes on each side, to permit unidirectional current flow responsive to a switch. The diodes may be zener diodes.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the FIGs. For example, two operations and/or FIGs shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The inventors have newly recognized one of the major reasons limiting access to Braille is the cost of electronic Braille displays. Electronic Braille displays are commonly known as "Refreshable Braille display" which have several pins moving up and down emulating the b Braille dots. Each piezoelectric actuated Braille dot costs around USD 4 and in a standard display of 40 cells, it sums up to USD 1,280 which is not affordable to majority of the blind and which is extremely high for the utility provided by such devices. This high cost limits its use in low-income settings where there is a relatively higher concentration of blind population, and there is a need to produce much less expensive electronic Braille displays. To overcome these newly-recognized problems as well as others and achieve these advantages, the inventors have developed example embodiments and methods described below to address these and other problems recognized by the Inventors with unique solutions enabled by example embodiments.

The present invention is Braille cell systems and methods of actuating the same. In contrast to the present invention, the few example embodiments and example methods discussed below illustrate just a subset of the variety of different configurations that can be used as and/or in connection with the present invention.

Figure 3A:
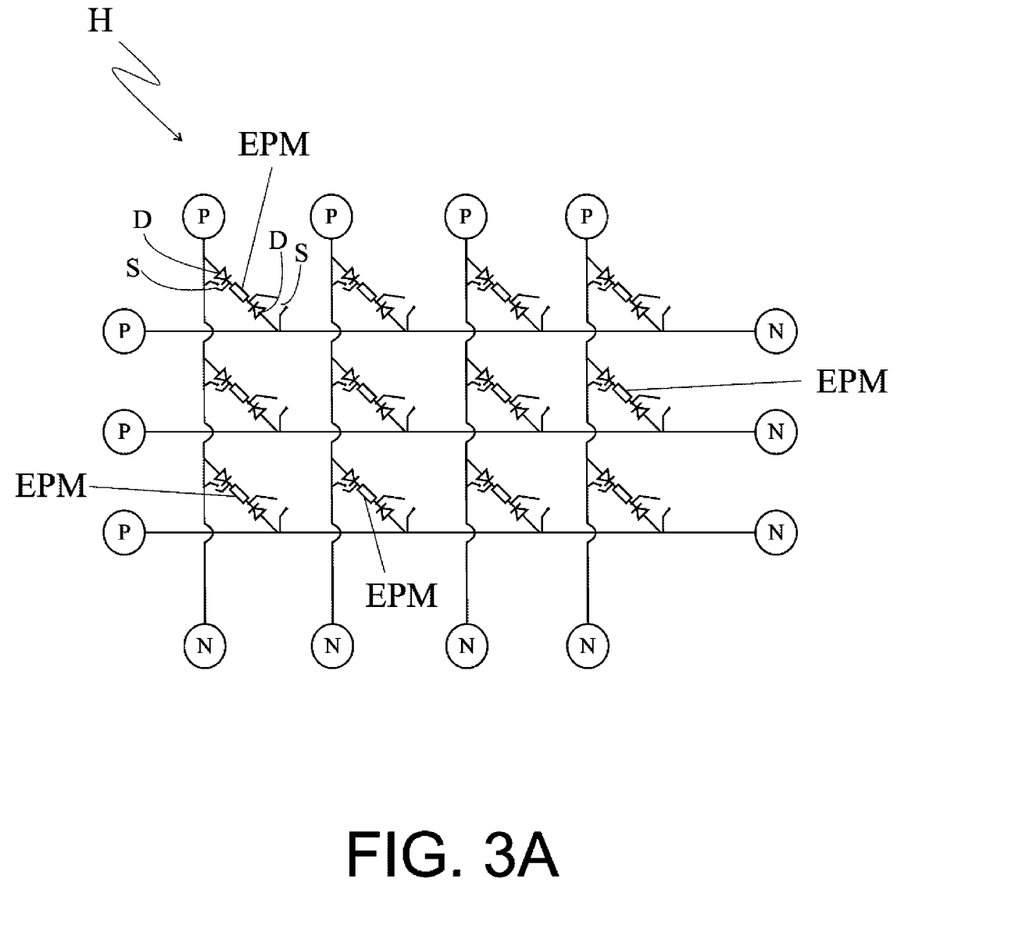
FIG. 3A illustrates a first example embodiment of a mesh framework.

In accordance with an example embodiment, there is provided a pre-defined mesh framework communicably coupled with magnets, such as, electro-permanent magnets—referenced by the numeral EPM. FIG. 3A illustrates the mesh framework according to a first example embodiment.

In at least one embodiment, electro-permanent magnets (EPMs) are used for actuation. They are a hybrid of electromagnets and permanent magnets. When coupled with a ferrous plate they form a linear actuator. This actuator is used to move the tactile pins operatively upward and operatively downward. When several of these tactile pins are stacked together, there is a need to provide efficient routing and driving circuit. To meet the stringent dimensional and performance norms of tactile displays, Electro-permanent magnets (EPMs) are used for actuation. The mesh framework is used to electrically actuate the electro-permanent magnets (EPMs) and create a 10-fold reduction in number of driving elements.

A mesh like structure is made with half H-bridges. To actuate the electro-permanent magnets (EPMs) at a pre-defined position in an array, the half H-bridges (illustrated by reference numeral H) of corresponding row and column is activated. Each row is flanked by a P-channel MOSFET on one side and an N-channel MOSFET on its other side. Similarly, each column is flanked by a P-channel MOSFET on one side and an N-channel MOSFET on its other side. Each junction of this array of rows and columns includes an electro-permanent magnet (EPM). Diodes (D) are provided on either side of the EPM, at each junction, in the array such that current flows in one pre-defined route/direction.

In at least one embodiment, between each diode (D) and an adjacently corresponding EPM, a switch (S) is provided. The reason for keeping the switch and the diodes is to remove the looping problem (surrounding EPMs are actuated while trying to actuate one particular EPM). When there is a need to pass a current in one particular EPM in one particular direction, the corresponding N-channel and P-channel MOSFETs are activated. To avoid the current from flowing in other EPMs, in at least one embodiment a diode and switch are kept. The switch is turned on in order to short the diode which blocks the current in the EPM of interest and hence allows current to flow in that particular EPM only in that particular direction.

E.g. in order to actuate an EPM in row 1 and column 1, the half H-bridges of row 1 and column 1 are activated and current will form one of the half H-bridges through the EPM (1,1) into the second Half H-bridge. By using such a structure, it is possible to reduce the number of H-bridges from the number of EPMs to a minimum of (sq. root of no. of EPMs)*2. This activation is done by means of the switches (S) and diodes (D).

Figure 3B:
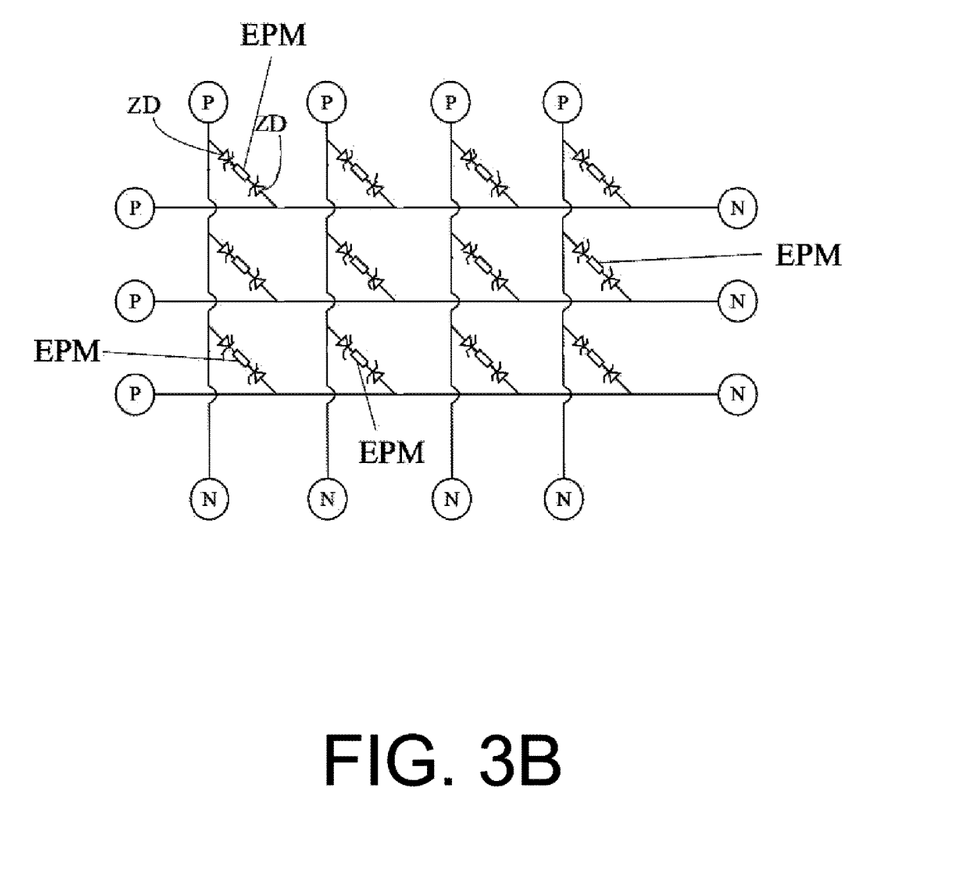
FIG. 3B illustrates a second example embodiment mesh framework.

FIG. 3B illustrates the mesh framework according to a second example embodiment. In at least an alternative embodiment, the diodes are Zener diodes (ZD) and no switch is provided. A Zener diode is a diode which allows current to flow in the forward direction in the same manner as an ideal diode, but also permits it to flow in the reverse direction when the voltage is above a certain value known as the breakdown voltage, "Zener knee voltage".

In at least the alternative diode, Zener diodes solve the looping problem. Zener diode as explained above has a threshold voltage (knee voltage) above which it allows current to pass when in reverse bias. There are 2 Zener diodes (ZD) around each EPM in opposite direction. So, whenever the MOSFETs are activated to flow current in one particular EPM in one direction, the Zener diodes produce a voltage drop. If V is applied across the MOSFETs, the Zener diode pairs are selected to produce V/3 voltage drop. So, the EPM corresponding to which the MOSFETs have been activated receives 2V/3 voltage. The other path (loop) requires the current to flow through at least 3 EPMs and 3 Zener diode pairs. Hence, if each Zener diode pair produces a voltage drop of V/3. The total drop by Zener diodes in the loop becomes V which is equal to the applied voltage at the MOSFETs. Hence there is no voltage left to actuate the EPMs in the loop. So, by this method, loops can be removed while removing the switches. This embodiment replaces a mechanical switch, thereby reducing cost, time lag, and risk of failure.

Figure 2:
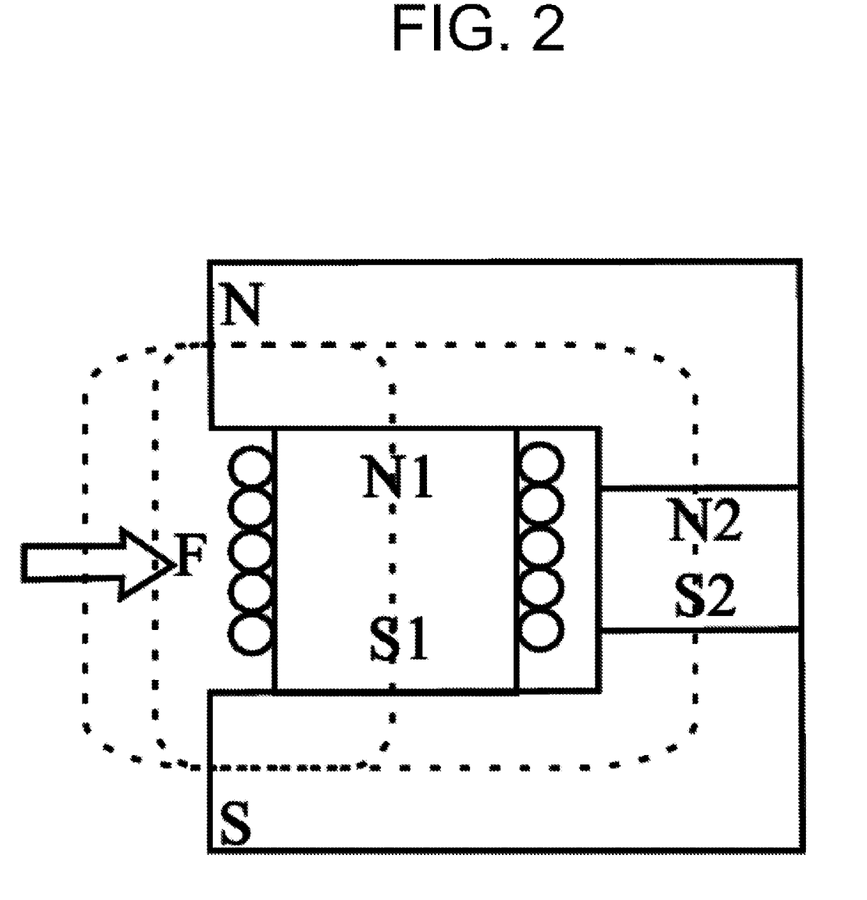
FIG. 2 illustrates a mechanical principle of operation of electro-permanent magnets (EPMs).

FIG. 2 relates to mechanical principle of operation of electro-permanent magnets (EPMs). An electro-permanent magnet (EPM) may include 2 magnets; a soft magnet, Alnico (referenced by N1S1) surrounded by a coil and a powerful hard magnet, Neodymium (referenced by N2S2). Both the magnets are sandwiched between ferrous metal plates. By switching the poles of the Alnico magnet through the coil, it is possible to alter the magnetic flux going out of the actuator (EPMs). When the Alnico and Neodymium are magnetized in the same direction, the flux of both the magnets flows through the metal plates and out of the EPM. By passing a short pulse in the coil, the Alnico magnet goes through a hysteresis loop and magnetizes in the opposite direction. Now, the flux of Neodymium flows into the Alnico and no flux leaks out of the EPM. Hence, by controlling the flux outside from 0% to 100%, it is possible to simulate a switch like behavior of magnetic attraction.

An H bridge is an electronic circuit that enables a voltage to be applied across a load in either direction.

Figure 4:
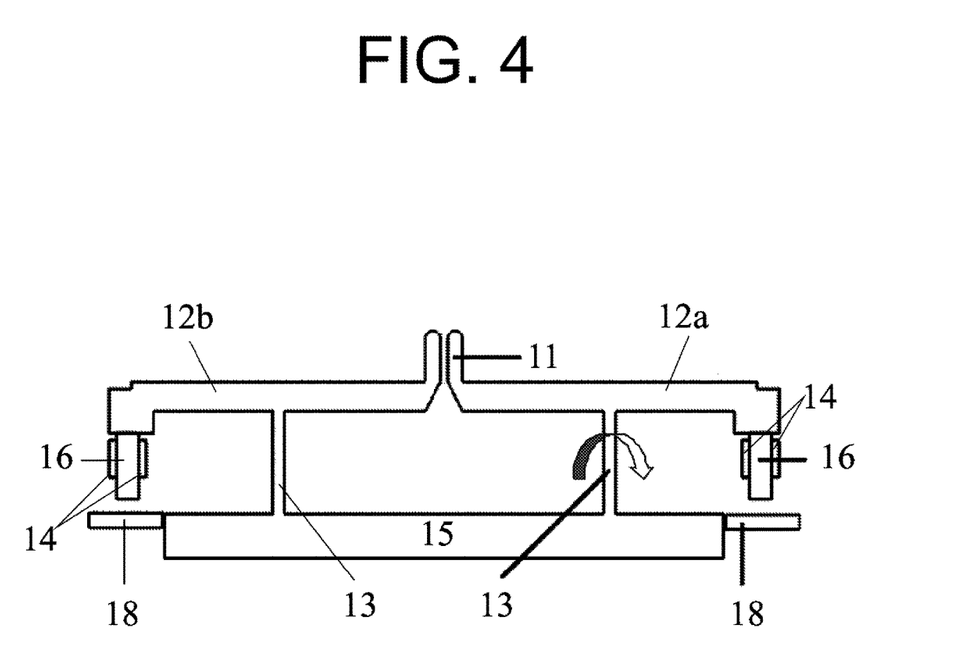
FIG. 4 illustrates a first example embodiment of an angularly-displaceable actuator.

In accordance with another example embodiment, there is provided an angularly-displaceable actuator assembly with in order to provide actuation of a dot in a Braille cell as per requirement for use in a refreshable Braille reader display. FIG. 4 illustrates a first example embodiment of the angularly-displaceable actuator assembly. In its first example embodiment, a first operatively horizontally disposed elongate rod (12a) is provided with an operative proximal end and an operative distal end. This first elongate rod (12a) is angularly-displaceable about a pivot hinge (13). This pivot hinge (13) is a flexible hinge. Further, a second operatively horizontally disposed elongate rod (12b) is provided with an operative proximal end and an operative distal end and is in co-axial with the first operatively horizontally disposed elongate rod (12b). This second elongate rod (12b) is also angularly-displaceable about a pivot hinge (13).

In at least a first example embodiment, at the operative distal end of the first operatively horizontally disposed elongate rod (12a), there is provided an electro-permanent magnet (16). This electro-permanent magnet is located in a cantilever manner and may be held by brackets (14). Further, in at least this first example embodiment, at least a tactile pin (11) is provided at the operative proximal end of the first operatively horizontally disposed elongate rod (12a). This pin (11) protrudes away from the direction of the electro-permanent magnet (16). The hinge has its one end configured to a base (15) and its other end configured to the first operatively horizontally disposed elongate rod (12a). In at least this first example embodiment, a metal plate (18) extends longitudinally to the base (15) and below the cantilever-positioned electro-permanent magnet such that as the electro-permanent magnet is magnetically actuated, it gets attracted to the metal plate (18) beneath it. The hinge (15) which is flexible in nature allows the electro-permanent magnet (16) to move towards the metal plate (18), thereby angularly displacing the tactile pin (11) in a direction away from the direction of electro-permanent magnet movement, thus allowing it to engage with a Braille dot located advantageously over it.

Similarly, in at least this first example embodiment, at the operative distal end of the second operatively horizontally disposed elongate rod (12b), there is provided an electro-permanent magnet (16). This electro-permanent magnet is located in a cantilever manner and may be held by brackets (14). Further, in at least this first example embodiment, at least a tactile pin (11) is provided at the operative proximal end of the second operatively horizontally disposed elongate rod (12b). This pin (11) protrudes away from the direction of the electro-permanent magnet (16). The hinge has its one end configured to a base (15) and its other end configured to the first operatively horizontally disposed elongate rod (12a). In at least this first example embodiment, a metal plate (18) extends longitudinally to the base (15) and below the cantilever-positioned electro-permanent magnet (16) such that as the electro-permanent magnet is magnetically actuated, it gets attracted to the metal plate (18) beneath it. The hinge (15) which is flexible in nature allows the electro-permanent magnet (16) to move towards the metal plate (18), thereby angularly displacing the tactile pin (11) in a direction away from the direction of electro-permanent magnet movement, thus allowing it to engage with a Braille dot located advantageously over it. This enables to spread out the EPMs and drastically reduce interference.

FIG. 4, above, helps understand the actuation. When the electro-permanent magnet is in active state, it gets attracted to the metal plate and hence, moves down. Since the horizontal part of the pin is rigid, the flexible hinge bends to compensate for the electro-permanent magnet's movement and the pin head moves operatively upward. This flexible hinge also acts as a resilient element hence when the electro-permanent magnet is deactivated, the flexible hinge reconciles and brings the electro-permanent magnet and pin head to its previous position.

When an electric pulse in a first direction is passed through the electro-permanent magnet (16), it leaks all its flux and is attracted towards the metal plate (18). This attraction translates into physical displacement of the electro-permanent magnet (16) and consequently of the tactile pin (11). To bring back the pin (11) to its initial state, another pulse in the opposite direction (to the first direction) is passed through the electro-permanent magnet, stopping the leakage of flux and eventually removing the attraction. The pin (11) falls back to its initial state due to gravity. This can be repeated millions of time. As the pin (11) moves up, it engages with a Braille dot and the Braille is embossed in accordance with the line that is to be converted to Braille language and that is to be read.

Figure 5:
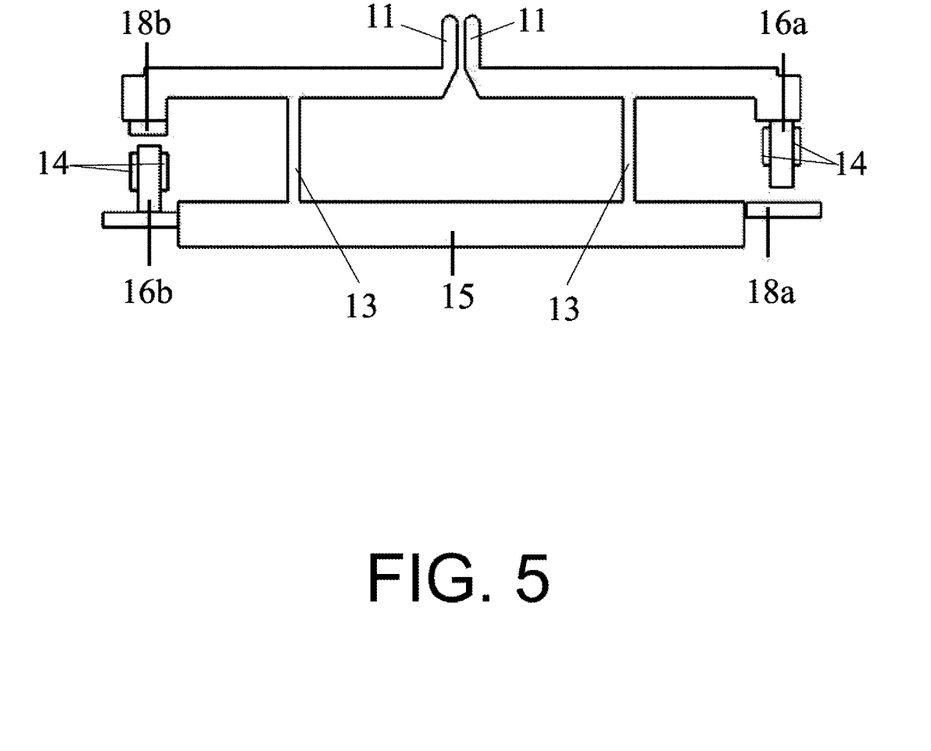
FIG. 5 illustrates a second example embodiment of an angularly displaceable actuator.

FIG. 5 illustrates a second example embodiment of the angularly-displaceable actuator assembly. In a second example embodiment, a first operatively horizontally disposed elongate rod (12a) is provided with an operative proximal end and an operative distal end. This first elongate rod (12a) is angularly-displaceable about a pivot hinge (13). This pivot hinge (13) is a flexible hinge. Further, a second operatively horizontally disposed elongate rod (12b) is provided with an operative proximal end and an operative distal end and is co-axial with the first operatively horizontally disposed elongate rod (12b). This second elongate rod (12b) is also angularly-displaceable about a pivot hinge (13).

In at least a second example embodiment, at the operative distal end of the first operatively horizontally disposed elongate rod (12a), there is provided a first electro-permanent magnet (16). This first electro-permanent magnet is located in a cantilever manner and may be held by brackets (14). Further, in at least this second example embodiment, at least a first tactile pin (11) is provided at the operative proximal end of the first operatively horizontally disposed elongate rod (12a). This first pin (11) protrudes away from the direction of the electro-permanent magnet (16). The hinge has its one end configured to a base (15) and its other end configured to the first operatively horizontally disposed elongate rod (12a). In at least this second example embodiment, a first metal plate (18) extends longitudinally to the base (15) and below the cantilever-positioned electro-permanent magnet such that as the electro-permanent magnet is magnetically actuated, it gets attracted to the metal plate (18a) beneath it. The hinge (15) which is flexible in nature allows the first electro-permanent magnet (16) to move towards the first metal plate (18a), thereby angularly displacing the first tactile pin (11) in a direction away from the direction of the first electro-permanent magnet movement, thus allowing it to engage with a Braille dot located advantageously over it.

Similarly, in at least this second example embodiment, at the operative distal end of the second operatively horizontally disposed elongate rod (12b), there is provided a second metal plate (18b) extending in a cantilever manner operatively below the operative distal end of the second operatively horizontally disposed elongate rod (12b). A second electro-permanent magnet is located in an operatively upward protruding manner and located at coaxially and at the operative distal end of the base opposite to the first metal plate. This second electro-permanent magnet may be held by brackets (14). Further, in at least this second example embodiment, at least a second tactile pin (11) is provided at the operative proximal end of the second operatively horizontally disposed elongate rod (12b). This second pin (11) protrudes in the direction of the second electro-permanent magnet (16). The hinge has its one end configured to a base (15) and its other end configured to the second operatively horizontally disposed elongate rod (12a). In at least this second example embodiment, the second metal plate (18) is located above second electro-permanent magnet (16b) such that as the electro-permanent magnet is magnetically actuated, it gets attracted to the second metal plate (18b) beneath it, and pulls the second metal plate (18b) towards it. The hinge (15) which is flexible in nature allows the second metal plate (18b) to move towards the second electro-permanent magnet (16b), thereby angularly displacing the second tactile pin (11) in an operative upward direction, thus allowing it to engage with a Braille dot located advantageously over it.

When an electric pulse in a first direction is passed through the electro-permanent magnet (16a), it leaks all its flux and is attracted towards the metal plate (18a) or the metal plate (18b) is attracted towards the electro-permanent magnet (16b). This attraction translates into physical displacement of the electro-permanent magnet (16a) and/or the metal plate (18b) and consequently of the corresponding tactile pin (11). To bring back the pin (11) to its initial state, another pulse in the opposite direction (to the first direction) is passed through the electro-permanent magnet, stopping the leakage of flux and eventually removing the attraction. The pin (11) falls back to its initial state due to gravity. This can be repeated millions of time. As the pin (11) moves up, it engages with a Braille dot and the Braille is embossed in accordance with the line that is to be converted to Braille language and that is to be read.

Figure 6:
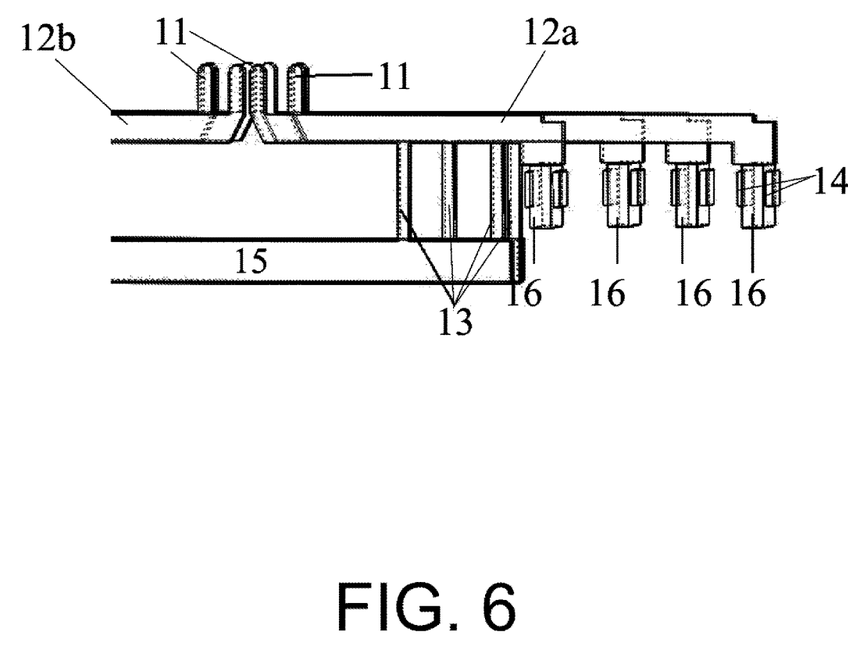
FIG. 6 illustrates an example embodiment system of actuators or pins.

In accordance with yet another example embodiment, there is provided a 2-level system of pins (11) spaced adjacent each other, in that, elongate rods (12) are spaced adjacent each other in a manner such that it incorporates all actuator elements within the dimensions of a Braille cell.

When there is only a single line is to be made, the space perpendicular to the line is free and can be utilized by the Braille cells. This extra space is utilized by spreading out the electro-permanent magnets as shown in the FIG. 6.

FIG. 6 illustrates a complete system of actuators or pins (11), according to a first example embodiment. It is to be understood that a similar system of actuators or pins (11) can also be formed in accordance with a second example embodiment. This arrangement of pins (11) is done in such a way that it ensures minimal interference with adjoining electro-permanent magnets (14). This FIG. illustrates tactile pins which are 8 in number so that they correspond with 8 dots in a Braille cell. 4 pins are seen on the left-hand side and 4 pins are seen on the right-hand side. In at least one embodiment, the pins (11) and the rods may be operatively horizontally spaced apart relative to each other such that a configuration of pins is formed which pins correspond to an 8-dot Braille cell. This configuration of eight pins, eight electro-permanent magnets, and other elements may form an array.

Since the spacing of the electro-permanent magnets is fairly increased by spreading them out in the Y-direction (perpendicular to the direction of the line), the electro-permanent magnets can be fixed and metal pieces can be made movable (attached to the pins). This can only be done due to the reduction of electro-permanent magnet distances.

Example embodiments made the Braille cell as well as the assembly, modular and replaceable. There is at least 10-fold reduction in manufacturing costs as compared to related art Braille cells. Furthermore, this design is easy to manufacture and for electrical routing. The pins with the hinge and resilient element along with the elongate rod are all one body, which reduces the assembly time and fabrication cost. The height of single-lines becomes half of the multi-line (2-level cells).

Example methods and embodiments thus being described, it will be appreciated by one skilled in the art that example embodiments may be varied through routine experimentation and without further inventive activity. For example, example embodiments have been described in large Braille cell displays, it is understood that vastly different sizes and types of displays may be used in the same. Variations are not to be regarded as departure from the spirit and scope of the exemplary embodiments, and all such modifications as would be obvious to one skilled in the art are intended to be included within the scope of the following claims.

What is claimed is:

1. A Braille cell assembly for single-line Braille display, comprising:
    an angularly-displaceable actuator configured to provide actuation of a Braille dot in a Braille cell in a refreshable Braille reader display, wherein the angularly-displaceable actuator includes,
        a first horizontally-disposed elongate rod with a proximal end and a distal end, wherein the elongate rod is angularly-displaceable about a pivot hinge,
        a base configured to hold a first end of the pivot hinge, wherein the pivot hinge includes a second end coupled to the horizontally-disposed elongate rod,
        an electro-permanent magnet on the first horizontally-disposed elongate rod spaced apart from a metal plate on the base, such that magnetic actuation of the electro-permanent magnet causes angular displacement of the first horizontally-disposed elongate rod about the pivot hinge,
        a tactile pin at a proximal end of the first horizontally-disposed elongate rod, wherein the electro-permanent magnet is configured to,
            in response to a first electric pulse in a first direction passed through the electro-permanent magnet, be magnetically attracted to the fixed plate so as to cause angular displacement of the first-horizontally disposed elongate rod and physical displacement of the tactile pin to engage with the Braille dot spaced apart from a head of the tactile pin head, and
            in response to a second electric pulse in a second direction opposite to the first direction passed through the electro-permanent magnet, stop being magnetically attracted to the fixed plate so as to cause the tactile pin to fall back and disengage from the Braille dot.

2. The Braille cell assembly of claim 1, wherein the pivot hinge is a flexible hinge.

3. The Braille cell assembly of claim 1, further comprising:
a second horizontally-disposed elongate rod with a proximal end and a distal end, wherein the second horizontally-disposed elongate rod is co-axial with the first horizontally-disposed elongate rod and is angularly-displaceable about another pivot hinge.

4. The Braille cell assembly of claim 1, wherein the first horizontally-disposed elongate rod includes the electro-permanent magnet.

5. The Braille cell assembly of claim 1, wherein the first horizontally-disposed elongate rod includes the metal plate.

6. The Braille cell assembly of claim 1, further comprising:
a second horizontally-disposed elongate rod with a proximal end and a distal end, wherein the second horizontally-disposed elongate rod is co-axial with the first horizontally-disposed elongate rod and is angularly-displaceable about another pivot hinge, wherein the first and the second horizontally-disposed elongate rods include electro-permanent magnets.

7. The Braille cell assembly of claim 1, further comprising:
a second horizontally-disposed elongate rod with a proximal end and a distal end, wherein the second horizontally-disposed elongate rod is co-axial with the first horizontally-disposed elongate rod and is angularly-displaceable about another pivot hinge, wherein the first and the second horizontally-disposed elongate rods include electro-permanent magnets and metal plates.

8. The Braille cell assembly of claim 1, wherein the electro-permanent magnet is cantilevered.

9. The Braille cell assembly of claim 1, wherein the electro-permanent magnet is directly adjacent to the base.

10. The Braille cell assembly of claim 1, wherein the metal plate is cantilevered.

11. The Braille cell assembly of claim 1, wherein the metal plate is directly adjacent to the base.

12. The Braille cell assembly of claim 1, further comprising:
a second horizontally-disposed elongate rod with a proximal end and a distal end, wherein the second horizontally-disposed elongate rod is co-axial with the first horizontally-disposed elongate rod and is angularly-displaceable about another pivot hinge, wherein the second horizontally-disposed elongate rod includes a tactile pin at the proximal end.

13. The Braille cell assembly of claim 1, wherein the tactile pin is a Braille pin head.

14. The Braille cell assembly of claim 1, wherein the pivot hinge is a resilient element.

15. The Braille cell assembly of claim 1, wherein the metal plate extends longitudinally to the base and below the electro-permanent magnet cantilevered such that as the electro-permanent magnet is magnetically actuated, the electro-permanent magnet is attracted to the metal plate.

16. The Braille cell assembly of claim 1, further comprising:
a second horizontally-disposed elongate rod with a proximal end and a distal end, wherein the second horizontally-disposed elongate rod is co-axial with the first horizontally-disposed elongate rod and is angularly-displaceable about another pivot hinge, wherein the metal plate extends longitudinally to the second horizontally-disposed elongate rod and above the electro-permanent magnet located at a distal end of the base such that as the electro-permanent magnet is magnetically actuated, the electro-permanent magnet is attracted to the metal plate.

17. The Braille cell assembly of claim 1, wherein the Braille dot is embossed in Braille language to be read.

18. The Braille cell assembly of claim 1, further comprising:
a pre-defined mesh framework communicably coupled with the electro-permanent magnet, wherein the mesh framework includes half H-bridges.

19. The Braille cell assembly of claim 1, further comprising:
a pre-defined mesh framework communicably coupled with the electro-permanent magnet, wherein the mesh framework includes an array of rows and columns with,
each of the rows having a P-channel MOSFET on one end and an N-channel MOSFET on another end,
each of the columns having a P-channel MOSFET on one end and an N-channel MOSFET on another end, and
each junction of a row and a column includes an electro-permanent magnet having diodes on each side so that current flows in one direction, and wherein the diodes are activated by corresponding switches.

20. The Braille cell assembly of claim 19, wherein the diodes are zener diodes.

* * * * *